US010072138B2

(12) United States Patent
Naka et al.

(10) Patent No.: US 10,072,138 B2
(45) Date of Patent: *Sep. 11, 2018

(54) RUBBER COMPOSITION FOR USE IN TIRE TREADS

(75) Inventors: Ayumi Naka, Hiratsuka (JP); Takashi Shirokawa, Hiratsuka (JP); Makoto Ashiura, Hiratsuka (JP); Yoshihiro Kameda, Hiratsuka (JP); Masaki Satou, Hiratsuka (JP)

(73) Assignee: The Yokohama Rubber Co., LTD (JP)

( * ) Notice: Subject to any disclaimer, the term of this patent is extended or adjusted under 35 U.S.C. 154(b) by 993 days.

This patent is subject to a terminal disclaimer.

(21) Appl. No.: 13/991,414

(22) PCT Filed: Nov. 25, 2011

(86) PCT No.: PCT/JP2011/077252
§ 371 (c)(1),
(2), (4) Date: Aug. 8, 2013

(87) PCT Pub. No.: WO2012/073838
PCT Pub. Date: Jun. 7, 2012

(65) Prior Publication Data
US 2013/0324638 A1    Dec. 5, 2013

(30) Foreign Application Priority Data

Dec. 3, 2010  (JP) .................. 2010-270813

(51) Int. Cl.
*C08K 3/36* (2006.01)
*B60C 1/00* (2006.01)
*C08L 15/00* (2006.01)
*C08C 19/44* (2006.01)
*C08F 236/10* (2006.01)
*C08L 57/02* (2006.01)
*C08C 19/25* (2006.01)

(52) U.S. Cl.
CPC ............ *C08L 15/00* (2013.01); *B60C 1/0016* (2013.01); *C08C 19/44* (2013.01); *C08F 236/10* (2013.01); *C08K 3/36* (2013.01); *C08L 57/02* (2013.01); *C08C 19/25* (2013.01); *Y02T 10/862* (2013.01)

(58) Field of Classification Search
CPC .......... B60C 1/0016; C08K 3/36; C08C 19/25
See application file for complete search history.

(56) References Cited

U.S. PATENT DOCUMENTS

| 4,914,147 A * | 4/1990 | Mouri ................. B60C 1/0016 524/495 |
| 5,639,530 A * | 6/1997 | Miron ...................... B63C 9/20 359/515 |
| 6,186,204 B1 * | 2/2001 | Sasaka ................. B60C 1/0016 152/209.5 |
| 2011/0144236 A1 * | 6/2011 | Mihara ................ B60C 1/0016 523/158 |
| 2015/0126643 A1 * | 5/2015 | Satou ...................... B60C 1/00 523/156 |

FOREIGN PATENT DOCUMENTS

| JP | H10-176080 | 6/1998 |
| JP | 2002-284933 | 10/2002 |
| JP | 2005-263905 | 9/2005 |
| JP | 2008297493 A * | 12/2008 |
| JP | 2010126672 A * | 6/2010 |
| JP | 2010-155935 | 7/2010 |
| JP | 2010-241898 | 10/2010 |
| WO | WO 2010-126095 | 11/2010 |

OTHER PUBLICATIONS

Machine translation of JP 2010-126672 A, Jun. 10, 2010.*
Machine translation of JP 2010-155935 A, Jul. 15, 2010.*
Machine translation of JP 2008-297493 A, published Dec. 11, 2008.*

* cited by examiner

*Primary Examiner* — Vickey M Nerangis
(74) *Attorney, Agent, or Firm* — Thorpe North & Western

(57) ABSTRACT

A rubber composition comprises a diene rubber including not less than 30% by weight of a modified conjugated diene polymer rubber and, per 100 parts by weight of the diene rubber, from 1 to 25 parts by weight of a tackifying resin, and from 25 to 80 parts by weight of a filler comprising not less than 50% by weight of silica. The modified conjugated diene polymer rubber has a terminal modified group comprising a functional group that interacts with silica. In the modified conjugated diene polymer rubber, aromatic vinyl unit content is from 38% to 48% by weight, vinyl unit content is from 20% to 35%, weight-average molecular weight is from 600,000 to 1,000,000, and glass transition temperature is from −22 to −32° C. A glass transition temperature of the tackifying resin is from 50 to 110° C. higher than the glass transition temperature of the modified conjugated diene polymer rubber.

8 Claims, 1 Drawing Sheet

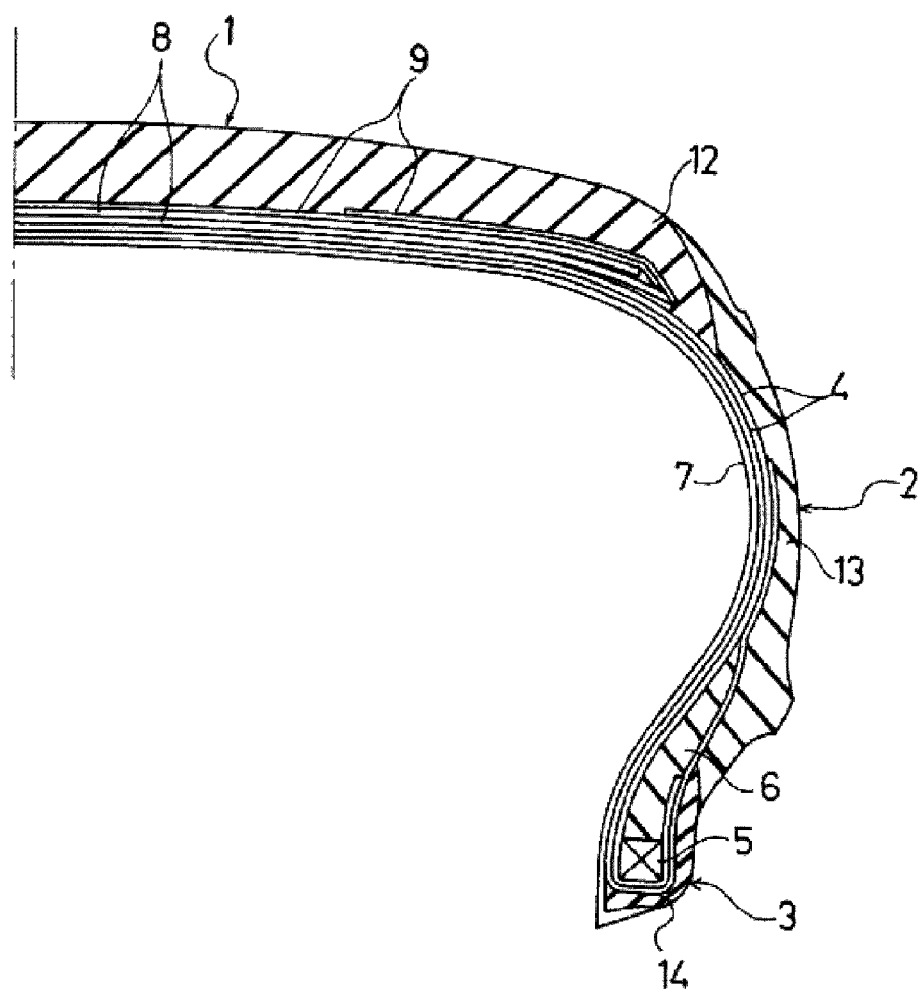

RUBBER COMPOSITION FOR USE IN TIRE TREADS

TECHNICAL FIELD

The present technology relates to a rubber composition for use in tire treads and particularly relates to a rubber composition for use in tire treads that enhances low rolling resistance and wet performance.

BACKGROUND ART

Increased interest in the global environmental issues has led to a demand for superior fuel consumption performance in pneumatic tires, along with steering stability and braking performance when traveling on wet road surfaces, and superior safety performance. As a result, by compounding silica in rubber compositions that form tread portions, dynamic visco-elasticity characteristics of the tread rubber such as loss tangent (tan δ) and the like has been improved, heat build-up has been suppressed, rolling resistance reduced, and fuel consumption performance improved, which has led to enhancements in wet performance. However, silica has poor affinity with diene rubber and dispersibility tends to be insufficient. Particularly, when the particle diameter of the silica is small, dispersibility worsens and, as a result, the effects of achieving reduced heat build-up and improving wet performance have not been obtainable.

To resolve this problem, Japanese Unexamined Patent Application Publication No. 2009-091498 proposes improving the dispersibility of silica by compounding silica in a rubber composition with a terminal-modified solution polymerization styrene butadiene rubber where the terminals are modified by a polyorganosiloxane or the like, thereby reducing heat build-up (tan δ at 60° C.) and enhancing wet grip performance (tan δ at 0° C.). Additionally, Japanese Unexamined Patent Application Publication No. 2007-321046 proposes a rubber composition comprising a styrene-butadiene copolymer rubber and, per 100 parts by weight thereof, from 80 to 180 parts by weight of a filler comprising not less than 50 parts by weight of a silica, and from 5 to 60 parts by weight of a resin having a softening point of 100 to 150° C.

However, the rolling resistance and wet performance obtained by the rubber compositions proposed in Japanese Unexamined Patent Application Publication No. 2009-091498 and Japanese Unexamined Patent Application Publication No. 2007-321046 are below those demanded by users and there is a need for further improvement in low rolling resistance and wet performance.

SUMMARY

The present technology provides a rubber composition for use in tire treads by which low rolling resistance and wet performance can be enhanced to or beyond conventional levels.

A rubber composition for use in tire treads comprises a diene rubber including not less than 30% by weight of a modified conjugated diene polymer rubber and, per 100 parts by weight of the diene rubber, from 1 to 25 parts by weight of a tackifying resin, and from 25 to 80 parts by weight of a filler. The filler comprises not less than 50% by weight of silica. Moreover, the modified conjugated diene polymer rubber is obtained by copolymerizing a conjugated diene monomer unit and an aromatic vinyl monomer unit in a hydrocarbon solvent using an organic active metal compound as an initiator. A resulting active conjugated diene polymer chain thereof has a terminal modified group, obtained by reacting the active terminal of the polymer chain with at least one type of compound having a functional group that is reactable with the active terminal of the polymer chain. The terminal modified group has a functional group that interacts with the silica. Furthermore, in the modified conjugated diene polymer rubber, aromatic vinyl unit content is from 38% to 48% by weight, vinyl unit content is from 20% to 35%, weight-average molecular weight is from 600,000 to 1,000,000, and glass transition temperature is from −22 to −32° C. A glass transition temperature of the tackifying resin is from 50 to 110° C. higher than the glass transition temperature of the modified conjugated diene polymer rubber.

The rubber composition for use in tire treads of the present technology comprises the diene rubber comprising not less than 25% by weight of the modified conjugated diene polymer rubber in which the aromatic vinyl unit content is from 38% to 48% by weight, the vinyl unit content is from 20% to 35%, the weight-average molecular weight is from 600,000 to 1,000,000, and the glass transition temperature is from −22 to −32° C. The active conjugated diene polymer chain is obtained by copolymerizing the conjugated diene monomer unit and the aromatic vinyl monomer unit. The active terminal of the active conjugated diene polymer chain is reacted with at least one type of compound having the functional group that is reactable with the active terminal in order to form the terminal modified group. The terminal modified group has the functional group that interacts with silica. Additionally, the rubber composition for use in tire treads of the present technology comprises, per 100 parts by weight of the diene rubber, from 1 to 25 parts by weight of the tackifying resin and from 25 to 80 parts by weight of the filler comprising not less than 50% by weight of silica. As a result, affinity between the diene rubber and the silica is increased and the dispersibility of the silica is enhanced, leading to a reduction in heat build-up, a decline in rolling resistance, and an enhancement in wet performance. Particularly, the modified conjugated diene polymer rubber takes on a fine phase-separated form due to setting the aromatic vinyl unit content to from 38% to 48% by weight. Moreover, the terminal modified group, produced through the reaction of the active terminal of the active conjugated diene polymer chain and the at least one compound having the functional group that is reactable with the active terminal of the active conjugated diene polymer chain, has the functional group that interacts with the silica and the weight-average molecular weight of the modified conjugated diene polymer rubber is set to from 600,000 to 1,000,000, resulting in the concentration of the terminal modified group being made appropriate. Therefore, the terminal modified group acts effectively on the silica, the dispersibility of the silica is further improved, the rolling resistance of the pneumatic tire is significantly reduced, and the wet performance can be further enhanced. Furthermore, the glass transition temperature of the tackifying resin is set to be from 50 to 110° C. higher than the glass transition temperature of the modified conjugated diene polymer rubber and, as a result, the wet performance can be further enhanced while maintaining superior low rolling resistance.

The compound comprising the functional group that is reactable with the active terminal of the active conjugated diene polymer chain described above preferably comprises at least one type of polyorganosiloxane compound selected from general formulae (I) to (III) below.

Formula (I)

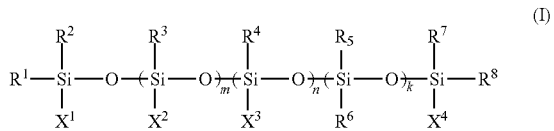

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group including from 2 to 20 repeating alkylene glycol units, a portion of the $X^3$ moieties optionally being groups derived from groups including from 2 to 20 repeating alkylene glycol units; and m is an integer from 3 to 200, n is an integer from 0 to 200, and k is an integer from 0 to 200.

Formula (II)

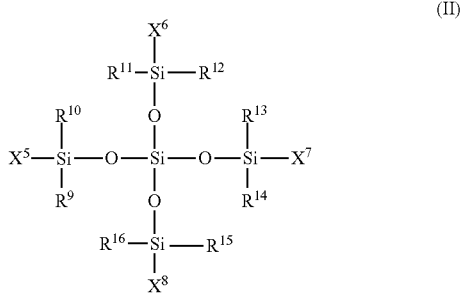

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain.

Formula (III)

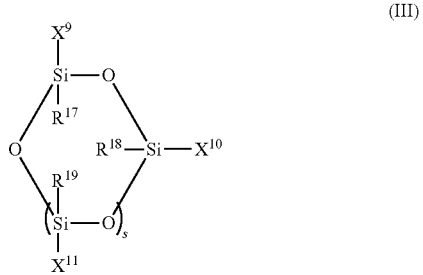

In formula (III), $R^{17}$ to $R^{19}$ are identical or different and are alkyl groups having from 1 to 6 carbons or aryl groups having from 6 to 12 carbons; and $X^9$ to $X^{11}$ are groups having functional groups that react with the active terminal of the active conjugated diene polymer chain; and s is an integer from 1 to 18.

The low rolling resistance and the wet performance can be enhanced to or beyond conventional levels via a pneumatic tire in which the rubber composition described above is used in the tread portion.

BRIEF DESCRIPTION OF THE DRAWING

FIG. 1 is a partial cross-sectional view in a tire meridian direction illustrating an example of an embodiment of a pneumatic tire in which a rubber composition for use in tire treads of the present technology is used.

BEST MODE FOR CARRYING OUT THE INVENTION

FIG. 1 illustrates an example of an embodiment of a pneumatic tire in which a rubber composition for use in tire treads is used. In FIG. 1, 1 is a tread portion, 2 is a side wall portion, and 3 is a bead portion.

In FIG. 1, two layers of a carcass layer 4, formed by arranging reinforcing cords extending in a tire radial direction in a tire circumferential direction at a predetermined pitch and embedding these reinforcing cords in a rubber layer, is disposed extending between left and right side bead portions 3. Both ends are made to sandwich a bead filler 6 around a bead core 5 that is embedded in the bead portions 3 and are folded back in a tire axial direction from the inside to the outside. An inner liner layer 7 is disposed inward of the carcass layer 4. Two layers of a belt layer 8, formed by arranging reinforcing cords extending inclined to the tire circumferential direction in the tire axial direction at a predetermined pitch and embedding these reinforcing cords in a rubber layer, is disposed on an outer circumferential side of the carcass layer 4 of the tread portion 1. The reinforcing cords of the two layers of a belt layer 8 cross interlamilarly so that the incline directions with respect to the tire circumferential direction are opposite each other. A belt cover layer 9 is disposed on an outer circumferential side of the belt layers 8. The tread portion 1 is formed from a tread rubber layer 12 on an outer circumferential side of the belt cover layer 9. The tread rubber layer 12 is formed from the rubber composition for use in tire treads. A side rubber layer 13 is disposed outward of the carcass layer 4 in each side wall portion 2, and a rim cushion rubber layer 14 is provided outward of the portion of the carcass layer 4 that is folded back around each of the bead portions 3.

In the rubber composition for use in tire treads of the present technology, the rubber component is a diene rubber and the diene rubber necessarily comprises a modified conjugated diene polymer rubber. The modified conjugated diene polymer rubber is a conjugated diene polymer rubber produced by solution polymerization, configured to have functional groups at both terminals of the molecular chain. By compounding the modified conjugated diene polymer rubber, affinity with silica is increased, and dispersibility is improved. As a result, the effects of the silica are further enhanced and the low rolling resistance and the wet performance are improved.

In the present technology, the backbone of the modified conjugated diene polymer is formed by a copolymer obtained by copolymerizing a conjugated diene monomer unit and an aromatic vinyl monomer unit. Examples of the conjugated diene monomer unit include 1,3-butadiene, isoprene(2-methyl-1,3-butadiene), 2,3-dimethyl-1,3-butadiene, 2-chloro-1,3-butadiene, 1,3-pentadiene, and the like. Examples of the aromatic vinyl monomer unit include styrene, 2-methylstyrene, 3-methylstyrene, 4-methylstyrene, alpha-methylstyrene, 2,4-dimethylstyrene, 2,4-diisoisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine, and the like.

The terminals of the conjugated diene polymer backbone are preferably formed from isoprene unit blocks. As a result of the terminals being formed from isoprene unit blocks, when the terminals are modified and the silica is compounded, affinity between the modified conjugated diene polymer and the silica is excellent and reduced heat build-up and wet performance are also excellent. Thus, in cases where the conjugated diene monomer units forming the polymer comprise conjugated dienes other than isoprene units, isoprene unit blocks are preferably introduced on the polymer terminals by adding isoprene to a solution containing the polymer having an active terminal prior to adding the compound having the functional group that is reactable with the active terminal of the active conjugated diene polymer chain or, alternatively, between subsequent adding of portions of this compound.

In the present technology, the conjugated diene polymer is prepared by copolymerizing the conjugated diene monomer unit and the aromatic vinyl monomer unit described above in a hydrocarbon solvent, using an organic active metal compound as an initiator. It is sufficient that the hydrocarbon solvent be a commonly used solvent, and examples thereof include cyclohexane, n-hexane, benzene, toluene, and the like.

The organic active metal catalyst to be used is preferably an organic alkali metal compound, and examples thereof include organic monolithium compounds such as n-butyllithium, sec-butyllithium, t-butyllithium, hexyl lithium, phenyl lithium, stilbene lithium, and the like; organic polyhydric lithium compounds such as dilithiomethane, 1,4-dilithiobutane, 1,4-dilithio-2-ethylcyclohexane, 1,3,5-trilithiobenzene, and the like; organic sodium compounds such as sodium napthalene and the like; and organic potassium compounds such as potassium napthalene and the like. Additionally, 3,3-(N,N-dimethylamino)-1-propyl lithium, 3-(N,N-diethylamino)-1-propyl lithium, 3-(N,N-dipropylamino)-1-propyl lithium, 3-morpholino-1-propyl lithium, 3-imidazole-1-propyl lithium, and organic lithium compounds having their chains extended by 1 to 10 units of butadiene, isoprene, or styrene; and the like can be used.

In the polymerization reaction, a polar aprotic compound such as an ether such as diethylether, diethylene glycol dimethylether, tetrahydrofuran, 2,2-bis(2-oxolanyl)propane, and the like, or an amine such as triethylamine, tetramethyl ethylenediamine, and the like may also be added for the purpose of randomly copolymerizing the aromatic vinyl monomer units and the conjugated diene monomer units.

In the present technology, at least one type of compound having a reactable functional group is attached to the active terminal of the active conjugated diene polymer chain obtained by copolymerizing the conjugated diene monomer units and the aromatic vinyl monomer units, and, thereby, a terminal modified group is produced. In this case, it is sufficient that the compound having the reactable functional group at the active terminal of the active conjugated diene polymer chain be attached to at least one active conjugated diene polymer chain, and one or more active conjugated diene polymer chains can be attached to each compound. That is, the modified conjugated diene polymer rubber used in the present technology can include modified rubbers having modifying groups at both terminals of the conjugated diene polymer, modified rubbers in which one or more of the modifying groups is optionally attached to a different conjugated diene polymer, and mixtures of a plurality of these modified rubbers. Additionally, the reaction between the active terminal of the active conjugated diene polymer chain and the compound having the functional group that is reactable with the active terminal can be a single-stage or multiple-stage reaction. Moreover, an identical or different compound may be sequentially reacted.

In the present technology, examples of the compound having the functional group that is reactable with the active terminal of the active conjugated diene polymer chain include tin compounds, silicon compounds, silane compounds, amido compounds and/or imide compounds, isocyanate and/or isothiocyanate compounds, ketone compounds, ester compounds, vinyl compounds, oxirane compounds, thiirane compounds, oxetane compounds, polysulfide compounds, polysiloxane compounds, polyorganosiloxane compounds, polyether compounds, polyene compounds, halogen compounds, and compounds having fullerenes. Among these, polyorganosiloxane compounds are preferable. One of these compounds or combinations of a plurality of these compounds can be attached to the polymer.

Specific examples of the compound that is reactable with the active terminal of the active conjugated diene polymer chain include polyglycidyl ethers of polyhydric alcohol such as ethylene glycol diglycidyl ether, glycerin triglycidyl ether, and the like; polyglycidyl ethers of aromatic compounds having two or more phenol groups such as bisphenol A diglycidylate and the like; polyepoxy compounds such as 1,4-diglycidyl benzene, 1,3,5-triglycidyl benzene, liquid polybutadiene polyepoxydate, and the like; epoxy group-containing tertiary amines such as 4,4'-diglycidyl-diphenyl methylamine, 4,4'-diglycidyl-dibenzyl methylamine, and the like; diglycidyl amino compounds such as diglycidyl aniline, diglycidyl-o-toluidine, tetraglycidyl metaxylylene diamine, tetraglycidyl amino diphenylmethane, tetraglycidyl-p-phenylenediamine, diglycidyl amino methylcyclohexane, tetraglycidyl-1,3-bis amino methylcyclohexane, and the like; and the like.

Examples of the silicon compound include tetrachlorosilicon, tetrabromosilicon, methyltrichlorosilicon, butyltrichlorosilicon, dichlorosilicon, bis(trichlorosilyl)silicon, and the like.

Examples of the tin compound include tetrachlorostannate, tetrabromostannate, methyltrichlorostannate, butyltrichlorostannate, dichlorostannate, bis(trichlorosilyl)stannate, and the like.

Examples of the silane compound include silane compounds having at least one selected from an alkoxy group, a phenoxy group, and a halogen. Examples of such silane compounds include dimethoxy dimethylsilane, diphenoxy dimethylsilane, diethoxy diethylsilane, triphenoxy methylsilane, triphenoxy vinylsilane, trimethoxy vinylsilane, triethoxy vinylsilane, tri(2-methylbutoxy)ethylsilane, tri(2-methylbutoxy)vinylsilane, triphenoxy phenylsilane, tetraphenoxysilane, tetraethoxysilane, tetramethoxysilane, tetrakis(2-ethylhexyloxy)silane, phenoxydivinyl chlorosilane, methoxybiethyl chlorosilane, diphenoxymethyl chlorosilane, diphenoxyphenyl iodosilane, diethoxymethyl chlorosilane, dimethoxymethyl chlorosilane, trimethoxy chlorosilane, triethoxy chlorosilane, triphenoxy chlorosilane, tris(2-ethylhexyloxy)chlorosilane, phenoxymethyl dichlorosilane, methoxyethyl dichlorosilane, ethoxymethyl dichlorosilane, phenoxyphenyl diiodosilane, diphenoxy dichlorosilane, dimethoxy dichlorosilane, bis(2-methylbutoxy)dibromosilane, bis(2-methylbutoxy)dichlorosilane, diethoxy dichlorosilane, methoxy trichlorosilane, ethoxy trichlorosilane, phenoxy trichlorosilane, (2-ethylhexyloxy) trichlorosilane, (2-methylbutoxy)trichlorosilane, and the like.

Additionally, aside from the functional groups described above, the silane compound can have a glycidyl group, an epoxy group, a methacryloxy group, and the like. Examples of such silane compounds include γ-glycidoxyethyl trimethoxysilane, γ-glycidoxypropyl trimethoxysilane, γ-glycidoxybutyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, γ-glycidoxypropyl methyldimethoxysilane, γ-glycidoxypropyl ethyldimethoxysilane, γ-glycidoxypropyl ethyldiethoxysilane, γ-glycidoxypropyl methyldiethoxysilane, γ-glycidoxypropyl methyldipropoxysilane, γ-glycidoxypropyl methyldibutoxysilane, γ-glycidoxypropyl methyldiphenoxysilane, γ-glycidoxypropyl dimethylmethoxysilane, γ-glycidoxypropyl diethylethoxysilane, γ-glycidoxypropyl dimethylethoxysilane, γ-glycidoxypropyl dimethylphenoxysilane, γ-glycidoxypropyl diethylmethoxysilane, γ-glycidoxypropyl methyldiisopropeneoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyl trimethoxysilane, γ-methacryloxypropyl triethoxysilane, γ-methacryloxymethyl trimethoxysilane, γ-methacryloxyethyl triethoxysilane, bis(γ-methacryloxypropyl)dimethoxysilane, tris(γ-methacryloxypropyl)methoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, β-(3,4-epoxycyclohexyl)ethyl-methyldiisopropeneoxysilane, and the like.

Examples of the isocyanate compound or isothiocyanate compound include aromatic polyisocyanate compounds such as 2,4-tolylene diisocyanate, 2,6-tolylene diisocyanate, diphenylmethane diisocyanate, naphthalene diisocyanate, tolidine diisocyanate, triphenylmethane triisocyanate, p-phenylene diisocyanate, tris(isocyanatephenyl)thiophosphate, xylylene diisocyanate, benzene-1,2,4-triisocyanate, naphthalene-1,2,5,7-tetraisocyanate, naphthalene-1,3,7-triisocyanate, phenylisocyanate, hexamethylene diisocyanate, methylcyclohexane diisocyanate, phenyl-1,4-diisothiocyanate, 2,4-tolylene diisocyanate, diphenylmethane diisocyanate, naphthalene diisocyanate, and the like.

Further examples include N-substituted aminoketones such as 4-dimethylamino benzophenone, 4-diethylamino benzophenone, 4-di-t-butylamino benzophenone, 4-diphenylamino benzophenone, 4,4'-bis(dimethylamino)benzophenone, 4,4'-bis(diethylamino)benzophenone, 4,4'-bis(di-t-butylamino)benzophenone, 4,4'-bis(diphenylamino) benzophenone, 4,4'-bis(divinylamino)benzophenone, 4-dimethylamino acetophenone, 4-diethylamino acetophenone, 1,3-bis(diphenylamino)-2-propanone, 1,7-bis(methylethylamino)-4-heptanone, and the like and corresponding N-substituted aminothioketones; N-substituted aminoaldehydes such as 4-diethylamino benzaldehyde, 4-divinylamino benzaldehyde, and the like and corresponding N-substituted aminothioaldehydes; N-substituted lactams such as N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenyl-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurilolactam, N-phenyl-ω-laurilolactam, N-t-butyl-laurilolactam, N-vinyl-ω-laurilolactam, N-benzyl-ω-laurilolactam, and the like and corresponding thiolactams; N-substituted ethyleneureas such as 3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-methyl-2-imidazolidinone, 1-methyl-3-2-ethoxyethyl-2-imidazolidinone, 1,3-dimethyl-3,4,5,6-tetrahydropyrimidinone, and the like and corresponding N-substituted thioethyleneureas and the like; benzophenones and thiobenzophenones having at least one amino group, alkylamino group or dialkylamino group on one or both benzene rings such as 4,4'-bis(dimethylamino)-benzophenone, 4,4'-bis(diethylamino)-benzophenone, 4,4'-bis(dibutylamino)-benzophenone, 4,4'-diamino benzophenone, 4-dimethylamino benzophenone, and the like and corresponding thiobenzophenones and the like; and the like.

The halogen and/or alkoxy group-containing silicon compound preferably is a compound expressed by general formula (IV) below. A plurality of active conjugated diene polymer chains can easily be attached to a molecule of this compound.

Formula (IV)

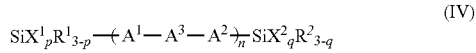

(IV)

In formula (IV), $X^1$ and $X^2$ are halogen atoms or alkoxy groups having from 1 to 20 carbons. p and q are each independently integers from 0 to 3 and the total number halogen atoms and alkoxy groups having from 1 to 20 carbons in the compound expressed by formula (IV) is not less than 5. $R^1$ and $R^2$ are each monovalent hydrocarbon groups having from 1 to 20 carbons. n is an integer of from 0 to 20 and $A^1$ and $A^2$ are each independently divalent hydrocarbons having a single bond or from 1 to 20 carbons. $A^3$ is a divalent group expressed by the formula —$(SiX^3{}_rA^3{}_{2-r})_m$—, —$NR^4$—, or —$N(-A^4-SiX^4{}_sR^5{}_{3-s})$—. $X^3$ and $X^4$ are halogen atoms or alkoxy groups having from 1 to 20 carbons. $R^3$ and $R^5$ are monovalent hydrocarbon groups having from 1 to 20 carbons. $R^4$ is a hydrogen atom or a monovalent hydrocarbon group having from 1 to 20 carbons. $A^4$ is a divalent hydrocarbon group having a single bond or from 1 to 20 carbons. r is an integer of from 0 to 2 and m is an integer of from 0 to 20. s is an integer of from 0 to 3.

Examples of the compound expressed by general formula (IV) include halogenated silicon compounds such as hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)hexane, and the like; alkoxysilane compounds such as hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)cyclohexane, bis(triethoxysilyl)cyclohexane, bis(triethoxysilyl)benzene, bis(trimethoxysilyl)octane, bis(triethoxysilyl)octane, bis(trimethoxysilyl)nonane, bis(triethoxysilyl)nonane, bis(trimethoxysilyl)ethylene, bis(triethoxysilyl)ethylene, bis(trimethoxysilylethyl)benzene, bis(triethoxysilylethyl)benzene, bis(3-trimethoxysilylpropyl)ethane, bis(3-triethoxysilylpropyl)ethane, and the like; alkoxysilane compounds having an amino group such as bis(3-trimethoxysilylpropyl)methylamine, bis(3-triethoxysilylpropyl)methylamine, bis(3-trimethoxysilylpropyl)ethylamine, bis(3-triethoxysilylpropyl)ethylamine, bis(3-trimethoxysilylpropyl)propylamine, bis(3-triethoxysilylpropyl)propylamine, bis(3-trimethoxysilylpropyl)butylamine, bis(3-triethoxysilylpropyl)butylamine, bis(3-trimethoxysilylpropyl)phenylamine, bis(3-triethoxysilylpropyl)phenylamine, bis(3-trimethoxysilylpropyl)benzylamine, bis(3-triethoxysilylpropyl)benzylamine, bis(trimethoxysilylmethyl)methylamine, bis(triethoxysilylmethyl)methylamine, bis(2-trimethoxysilylethyl)methylamine, bis(2-triethoxysilylethyl)methylamine, bis(triethoxysilylmethyl)propylamine, bis(2-triethoxysilylethyl)propylamine, and the like; alkoxysilane compounds having an amino group such as tris(trimethoxysilylmethyl)amine, tris(2-triethoxysilylethyl)amine, tris(3-trimethoxysilylpropyl)amine, tris(3-triethoxysilylpropyl)amine, and the like; and the like.

The polyorganosiloxane compound is preferably a compound expressed by general formulae (I) to (III) below. That is, the compound having the functional group that is reactable with the active terminal of the active conjugated diene polymer chain preferably includes at least one compound selected from these polyorganosiloxane compounds, and may include a combination of a plurality of these compounds. Additionally, these polyorganosiloxane compounds may be combined with another compound having a functional group that is reactable with the active terminal (e.g. the compound expressed by formula (IV) above).

General formula (I)

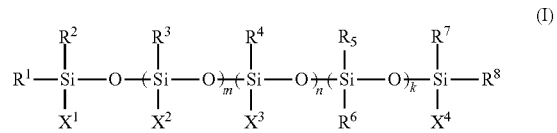

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group including from 2 to 20 repeating alkylene glycol units, a portion of the $X^3$ moieties optionally being groups derived from groups including from 2 to 20 repeating alkylene glycol units; and m is an integer from 3 to 200, n is an integer from 0 to 200, and k is an integer from 0 to 200.

General formula (II)

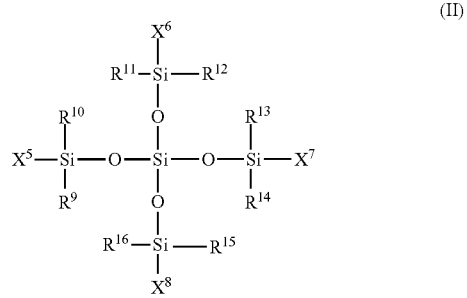

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain.

General formula (III)

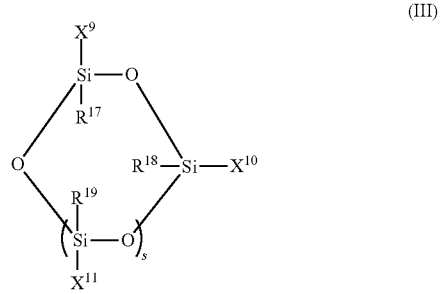

In formula (III), $R^{17}$ to $R^{19}$ are identical or different and are alkyl groups having from 1 to 6 carbons or aryl groups having from 6 to 12 carbons; and $X^9$ to $X^{11}$ are groups having functional groups that react with the active terminal of the active conjugated diene polymer chain; ands is an integer from 1 to 18.

Examples of the alkyl groups having from 1 to 6 carbons that constitute the $R^1$ to $R^8$, $X^1$, and $X^4$ moieties in the polyorganosiloxane expressed by general formula i (I) above include methyl groups, ethyl groups, n-propyl groups, isopropyl groups, butyl groups, pentyl groups, hexyl groups, cyclohexyl groups, and the like. Examples of the aryl groups having from 6 to 12 carbons include phenyl groups, methylphenyl groups, and the like. Among these alkyl groups and aryl groups, methyl groups are particularly preferable.

Examples of the group having the functional group, which reacts with the active terminal of the polymer chain, constituting the $X^1$, $X^2$, and $X^4$ moieties in the polyorganosiloxane expressed by general formula (I) include alkoxyl groups having from 1 to 5 carbons, hydrocarbon groups containing a 2-pyrrolidonyl group, and epoxy group-containing groups having from 4 to 12 carbons.

Examples of the alkoxyl groups having from 1 to 5 carbons constituting the $X^1$, $X^2$, and $X^4$ moieties include methoxy groups, ethoxy groups, propoxy groups, isopropoxy groups, butoxy groups, and the like. Among these methoxy groups are preferable. In cases where at least one of the $X^1$, $X^2$, and $X^4$ moieties is the alkoxyl group having from 1 to 5 carbons, when the polyorganosiloxane having the alkoxyl group is reacted with the active terminal of the active conjugated diene polymer chain, linkage between the silicon atom and the oxygen atom of the alkoxyl group breaks and the active conjugated diene polymer chain attaches directly to the silicon atom, thus forming a single bond.

Preferable examples of the hydrocarbon group containing a 2-pyrrolidonyl group constituting the $X^1$, $X^2$, and $X^4$ moieties include the groups expressed by the general formula (V) below.

Formula (V)

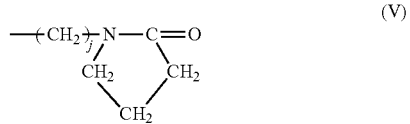

(V)

In formula (V), j is an integer of from 2 to 10, and j is particularly preferably 2.

Thus, when the polyorganosiloxane, in which at least one of the $X^1$, $X^2$, and $X^4$ moieties comprises the hydrocarbon group containing the 2-pyrrolidonyl group, is reacted with the active terminal of the active conjugated diene polymer chain, the carbon-oxygen bond in the carbonyl group constituting the 2-pyrrolidonyl group breaks and a structure is formed in which the polymer chain is bonded to the carbon atom.

Preferable examples of the epoxy group-containing group having from 4 to 12 carbons constituting the $X^1$, $X^2$, and $X^4$ moieties include the groups expressed by the general formula (VI) below.

General Formula (VI): ZYE

In formula (VI), Z is an alkylene group or an alkyl arylene group having from 1 to 10 carbons; Y is a methylene group, a sulfur atom, or an oxygen atom; and E is an epoxy group-containing hydrocarbon group having from 2 to 10 carbons. Among these, preferably Y is an oxygen atom; more preferably Y is an oxygen atom and E is a glycidyl group; and even more preferably Z is an alkylene group having three carbons, Y is an oxygen atom, and E is a glycidyl group.

In the polyorganosiloxane expressed by general formula (I), in cases where at least one of the $X^1$, $X^2$, and $X^4$ moieties is an epoxy group-containing group having from 4 to 12 carbons, when the polyorganosiloxane is reacted with the active terminal of the active conjugated diene polymer chain, the carbon-oxygen bond forming the epoxy ring breaks and a structure is formed in which the polymer chain is bonded to the carbon atom.

In the polyorganosiloxane expressed by general formula (I), of the above, $X^1$ and $X^4$ are preferably epoxy group-containing groups having from 4 to 12 carbons or alkyl group having from 1 to 6 carbons. Additionally, $X^2$ is preferably an epoxy group-containing group having from 4 to 12 carbons.

In the polyorganosiloxane expressed by general formula (I), $X^3$ is a group including from 2 to 20 repeating alkylene glycol units. Preferable examples of the group including from 2 to 20 repeating alkylene glycol units include the group expressed by general formula (VII) below.

Formula (VII)

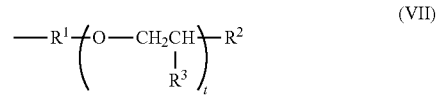

(VII)

In formula (VII), t is an integer of from 2 to 20, $R^1$ is an alkylene group or an alkyl arylene group having from 2 to 10 carbons, $R^3$ is a hydrogen atom or a methyl group, and $R^2$ is an alkoxyl group or an aryloxy group having from 1 to 10 carbons. Among these, preferably, t is an integer of from 2 to 8, $R^1$ is an alkylene group having three carbons, $R^3$ is a hydrogen atom, and $R^2$ is a methoxy group.

In the polyorganosiloxane expressed by general formula (II), $R^9$ to $R^{16}$ are identical or different and are alkyl groups having from 1 to 6 carbons or aryl groups having from 6 to 12 carbons. $X^5$ to $X^8$ are groups having functional groups that react with the active terminal of the polymer chain.

In the polyorganosiloxane expressed by general formula (III), $R^{17}$ to $R^{19}$ are identical or different and are alkyl groups having from 1 to 6 carbons or aryl groups having from 6 to 12 carbons. $X^9$ to $X^{11}$ are groups having functional groups that react with the active terminal of the polymer chain. s is an integer from 1 to 18.

In the polyorganosiloxane expressed by general formula (II) and general formula (III) above, the alkyl group having from 1 to 6 carbons, the aryl group having from 6 to 12 carbons, and the group having the functional group that reacts with the active terminal of the polymer chain are synonymous with those recited for the polyorganosiloxane expressed by general formula (I).

Furthermore, the terminal modified group produced as a result of the reaction described above has a functional group that interacts with silica. This functional group that interacts with silica may be the functional group included in the structure of the compound described above. The functional group may also be a functional group that is obtained as a result of the reaction between the compound and the active terminal. The functional group that interacts with silica is not particularly limited, and examples thereof include an alkoxysilyl group, a hydroxyl group (including those having organosiloxane structures), an aldehyde group, a carboxyl group, an amino group, an imino group, an epoxy group, an amido group, a thiol group, an ether group, and the like. Among these, the hydroxyl group (including that having an organosiloxane structure) is preferable. Thus, the terminal modified group includes the functional group that interacts with silica and, therefore, affinity with silica is further enhanced, which leads to significant improvement in dispersibility.

In the present technology, the concentration of the terminal modified group in the modified conjugated diene polymer rubber is determined by its relationship to the weight-average molecular weight (Mw) of the modified conjugated diene polymer rubber. The weight-average molecular weight of the modified conjugated diene polymer rubber is from 600,000 to 1,000,000 and is preferably from 650,000 to 850,000. If the weight-average molecular weight of the modified conjugated diene polymer rubber is less than 600,000, the concentration of the terminal modified group of the modified conjugated diene polymer rubber will increase and, while the dispersibility of the silica in the rubber composition will be better, the molecular weight of the polymer itself will be low. Therefore, the effects of improving the strength and rigidity of the rubber composition will not be obtained and, moreover, the degree of improvement in viscoelastic characteristics will be limited. If the weight-average molecular weight of the modified conjugated diene polymer rubber exceeds 1,000,000, the concentration of the terminal modified group of the modified conjugated diene polymer rubber will decrease, affinity with the silica will be insufficient, and dispersibility will be negatively affected. As a result, the effects of reducing the rolling resistance will be insufficient and the wet performance will be insufficient. Additionally, at the same time, the rigidity and the strength of the rubber composition will decline. Note that the weight-average molecular weight (Mw) of the modified conjugated diene polymer rubber is measured via gel permeation chromatography (GPC), in terms of standard polystyrene.

An aromatic vinyl unit content in the modified conjugated diene polymer rubber used in the present technology is from 38% to 48% by weight and preferably from 40% to 45% by weight. By configuring the aromatic vinyl unit content in the modified conjugated diene polymer rubber to be within this range, the rigidity and the strength of the rubber composition can be increased and the wet resistance can be further enhanced when the rubber is formed into a pneumatic tire. When compounding a diene rubber other than the modified conjugated diene polymer rubber, the modified conjugated diene polymer rubber takes on a fine phase-separated form from the other diene rubber. As a result, the modified conjugated diene polymer rubber gathers locally in the vicinity of the silica particles and the terminal modified groups act effectively on the silica, which leads to the affinity being further enhanced and the dispersibility of the silica being excellent. If the aromatic vinyl unit content in the modified conjugated diene polymer rubber is less than 38% by weight, the effect of forming the fine phase-separated form from the other diene rubber cannot be sufficiently obtained. Additionally, the effects of increasing the rigidity and the strength of the rubber composition cannot be sufficiently obtained. If the aromatic vinyl unit content in the modified conjugated diene polymer rubber exceeds 48% by weight, the glass transition temperature (Tg) of the conjugated diene polymer rubber will rise, the balance between viscoelastic characteristics will worsen, and it will be difficult to obtain the effects of reducing heat build-up. Note that the aromatic vinyl unit content in the modified conjugated diene polymer rubber is measured using infrared emission spectroscopy (Hampton technique).

In the present technology, a vinyl unit content in the modified conjugated diene polymer rubber is from 20% to 35% by weight and is preferably from 26% to 34% by weight. The glass transition temperature (Tg) of the modified conjugated diene polymer rubber can be made appropriate due to configuring the vinyl unit content in the modified conjugated diene polymer rubber to be from 20% to 35% by weight. Additionally, in this case, the fine phase-separated form of the modified conjugated diene polymer rubber from the other diene rubber can be stabilized. If the vinyl unit content in the modified conjugated diene polymer rubber is less than 20% by weight, the Tg of the modified conjugated diene polymer rubber will decrease and the dynamic visco-elasticity characteristic loss tangent (tan δ) at 0° C., which is the indicator of wet performance, will decline. Moreover, in this case, the fine phase-separated form of the modified conjugated diene polymer rubber cannot be stabilized. If the vinyl unit content in the modified conjugated diene polymer rubber exceeds 35% by weight, there is a possibility that vulcanization rate will decline and the strength and the rigidity will decline. Additionally, the rolling resistance cannot be reduced. Note that the vinyl unit content in the modified conjugated diene polymer rubber is measured using infrared emission spectroscopy (Hampton technique).

The glass transition temperature (Tg) of the modified conjugated diene polymer rubber is from −22 to −32° C. By configuring the Tg of the modified conjugated diene polymer rubber to be from −22 to −32° C., the wet performance can be ensured and the rolling resistance can be reduced. If the Tg of the modified conjugated diene polymer rubber is higher than −22° C., balance of the viscoelastic characteristics will be negatively affected and it will be difficult to obtain the effects of reducing the heat build-up. If the Tg of the modified conjugated diene polymer rubber is lower than −32° C., the Tg of the modified conjugated diene polymer rubber will decrease and the dynamic visco-elasticity characteristic loss tangent (tan δ) at 0° C., which is the indicator of grip on wet roads, will decline. The Tg of the modified conjugated diene polymer rubber is measured using a thermograph by differential scanning calorimetry (DSC) at a temperature elevation speed of 20° C./minute. The temperature at the midpoint of the transition region is set as the glass transition temperature thereof. Additionally, when the modified conjugated diene polymer rubber is an oil extended product, the glass transition temperature is the glass transition temperature of the modified conjugated diene polymer rubber in a state where the oil extension component (the oil) is not included.

The formability/processability of a rubber composition can be enhanced by oil extending the modified conjugated diene polymer rubber. The amount of oil extension is not particularly limited, but is preferably not more than 25 parts by weight per 100 parts by weight of the modified conjugated diene polymer rubber. If the amount of oil extension of the modified conjugated diene polymer rubber exceeds 25 parts by weight, the degree of freedom in formulation design when compounding oils, softeners, tackifiers, and the like in the rubber composition will be limited.

In the present technology, the content of the modified conjugated diene polymer rubber is not less than 30% by weight of 100% by weight of the diene rubber, and is preferably from 40% to 90% by weight. If the content of the modified conjugated diene polymer rubber is less than 30% by weight of the diene rubber, affinity with the silica will worsen, and dispersibility of the silica cannot be made excellent.

In the present technology, a diene rubber other than the modified conjugated diene polymer rubber can be compounded as a rubber component. Examples of the other diene rubber include natural rubber, isoprene rubber, butadiene rubber, non-terminal-modified solution polymerization styrene butadiene rubber (S-SBR), emulsion polymerization styrene butadiene rubber (E-SBR), butyl rubber, halogenated butyl rubber, and the like. The other diene rubber is preferably a natural rubber, an isoprene rubber, a butadiene rubber, or an emulsion polymerization styrene butadiene rubber. A single rubber may be used or multiple rubbers may be blended and used as the diene rubber. A content of the other diene rubber is not more than 70% by weight of 100% by weight of the diene rubber, and is preferably from 10% to 60% by weight.

With the rubber composition for use in tire treads of the present technology, due to the compounding of the tackifying resin, the wet performance, particularly, the steering stability on wet road surfaces, can be further improved while maintaining the low rolling resistance. Examples of the tackifying resin include those that have a glass transition temperature (Tg) that is from 50 to 110° C. higher than the Tg of the modified conjugated diene polymer rubber. By configuring the Tg of the tackifying resin to be not less than 50° C. higher than the Tg of the modified conjugated diene polymer rubber, the tan δ at 0° C. can be increased and the wet grip performance can be enhanced. If the upper limit of the Tg of the tackifying resin is set in excess of 110° C. higher than the Tg of the modified conjugated diene polymer rubber, the heat build-up will be negatively affected. Note that the Tg of the tackifying resin is measured according to the same method used in the measurement of the Tg of the modified conjugated diene polymer rubber described above.

The softening point of the tackifying resin is not particularly limited, but is preferably set to be from 130 to 170° C. and more preferably from 140 to 165° C. If the softening point of the tackifying resin is lower than 130° C., the effects of improving the wet performance cannot be sufficiently obtained. If the softening point of the tackifying resin exceeds 170° C., the dispersibility in the diene rubber will be negatively affected, the grip performance on wet road surfaces will decline, and the rubber strength will decline. The softening point of the tackifying resin is expressed as a value measured in accordance with Japanese Industrial Standard (JIS) K6220-1 (ball and ring method).

A compounded amount of the tackifying resin is preferably from 1 to 25 parts by weight and more preferably from 1 to 20 parts by weight per 100 parts by weight of the diene rubber. If the compounded amount of the tackifying resin is less than 1 part by weight, the effects of improving the wet grip performance cannot be sufficiently obtained. If the compounded amount of the tackifying resin exceeds 25 parts by weight, the low rolling resistance will be negatively affected. Moreover, the tackiness of the rubber composition will increase, and moldability/processability and handling will be negatively affected due to adhesion of the composition to the molding roller, and the like.

The type of tackifying resin used is not particularly limited, and examples thereof include natural resins such as terpene resins, rosin resins, and the like; and synthetic resins such as petroleum resins, carboniferous resins, phenol resins, xylene resin, and the like; and modified products thereof. Among these, terpene resins and/or petroleum resins are preferable and modified products of terpene resins are more preferable.

Preferably, examples of the terpene resins include α-pinene resin, β-pinene resin, limonene resin, hydrogenated limonene resin, dipentene resin, terpene phenol resin, terpene styrene resin, aromatic modified terpene resin, hydrogenated terpene resin, and the like. Among these, aromatic modified terpene resins are preferable, and examples thereof include aromatic modified terpene resins obtained by polymerizing a terpene such as α-pinene, β-pinene, dipentene, limonene, and the like, and an aromatic compound such as styrene, phenol, α-methylstyrene, vinyl toluene, and the like.

Examples of the petroleum resin include aromatic hydrocarbon resins or, alternatively, saturated or unsaturated aliphatic hydrocarbon resins. Examples thereof include $C_5$ petroleum resins (aliphatic petroleum resins formed by polymerizing fractions such as isoprene, 1,3-pentadiene, cyclopentadiene, methylbutene, pentene, and the like), $C_9$ petroleum resins (aromatic petroleum resins formed by polymerizing fractions such as α-methylstyrene, o-vinyl toluene, m-vinyl toluene, p-vinyl toluene, and the like), $C_5C_9$ copolymerization petroleum resins, and the like.

In the present technology, a compounded amount of the filler comprising not less than 50% by weight of silica is from 25 to 80 parts by weight and preferably from 20 to 75 parts by weight per 100 parts by weight of the diene rubber. By configuring the compounded amount of the filler to be within this range, the low rolling resistance and wet performance of the rubber composition can be balanced at higher levels. If the compounded amount of the filler is less than 25 parts by weight, the wet performance cannot be ensured. If the compounded amount of the filler exceeds 80 parts by weight, the low rolling resistance will be negatively affected.

The content of the silica in 100% by weight of the filler is not less than 50% by weight and is preferably from 70% to 100% by weight. By configuring the content of the silica in the filler to be within this range, the low rolling resistance and wet performance of the rubber composition can be balanced at higher levels. Additionally, by compounding the modified conjugated diene polymer rubber, affinity with the silica is increased and dispersibility is enhanced. As a result, the effects of compounding silica are further enhanced.

The silica may be any silica that is regularly used in rubber compositions for use in tire treads. Examples thereof include wet method silica, dry method silica, surface treated silica, and the like.

With respect to the particle characteristics of the silica, the nitrogen specific surface area ($N_2SA$) is preferably from 194 to 225 $m^2/g$. The $N_2SA$ of the silica is calculated in accordance with JIS K6217-2.

The high specific surface area silica described above displays strong interaction between particle surfaces and poor affinity with diene rubber. As a result, it is difficult to obtain excellent dispersibility when simply compounded with diene rubber and the effects of improving the dynamic visco-elasticity characteristics such as the tan δ and the like cannot be sufficiently obtained. Additionally, sufficient improvement of the dispersibility of high specific surface area silica has not necessarily been obtained even when compounded together with a conventional terminal-modified styrene-butadiene rubber.

In contrast, in the present technology, the dispersibility of the silica can be improved by compounding the high specific surface area silica together with the modified conjugated diene polymer rubber described above. As such, the modified conjugated diene polymer rubber and the high specific surface area silica both act to improve the tan δ, which leads to the attainment of greater synergy.

The silica to be used may be appropriately selected from commercially available products. Additionally, a silica obtained through a regular manufacturing method may be used.

In the rubber composition of the present technology, a silane coupling agent is preferably compounded together with the silica as such will lead to an improvement in the dispersibility of the silica and a further increase in the reinforcement action of the diene rubber. A compounded amount of the silane coupling agent is preferably from 3% to 20% by weight and more preferably from 5% to 15% by weight of the compounded amount of the silica. If the compounded amount of the silane coupling agent is less than 3% by weight of the weight of the silica, the effect of improving the dispersion of the silica cannot be sufficiently obtained. Additionally, if the compounded amount of the silane coupling agent exceeds 20% by weight, the silane coupling agents will polymerize, and the desired effects cannot be obtained.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and the like.

The rubber composition for use in tire treads of the present technology may also include other fillers other than the silica. Examples of such fillers other than the silica include, carbon black, clay, mica, talc, calcium carbonate, aluminum hydroxide, aluminum oxide, titanium oxide, and the like. Among these, carbon black is preferable. This is because rubber strength can be increased by compounding other fillers, including carbon black. A content of the other fillers is not more than 50% by weight and is preferably from 0% to 20% by weight of 100% by weight of the filler. If the content of the other fillers exceeds 50% by weight, the rolling resistance will worsen.

The rubber composition for use in tire treads may also include various compounding agents that are commonly used in rubber compositions for use in tire treads. Examples thereof include vulcanization or cross-linking agents, vulcanization accelerators, antiaging agents, plasticizers, processing aids, liquid polymers, thermosetting resins, and the like. These compounding agents can be kneaded by a common method to obtain a composition that can then be used for vulcanization or cross-linking. These compounding agents can be blended at conventional general amounts so long as the objects of the present technology are not hindered. The rubber composition for use in tire treads can be produced by mixing the above-mentioned components using a well-known rubber kneading machine such as a Banbury mixer, a kneader, an open roll, or the like.

The rubber composition for use in tire treads of the present technology can be advantageously used in pneumatic tires. The low rolling resistance and the wet performance can be enhanced to or beyond conventional levels via a pneumatic tire in which the rubber composition described above is used in the tread portion.

The present technology is further described below by examples. However, the scope of the present technology is not limited to these examples.

EXAMPLES 24 types of rubber compositions for use in tire treads were prepared according to the formulations shown in Tables 1 to 3 (Working Examples 1 to 7 and Comparative Examples 1 to 17). The shared components shown in Table 4 (with the exception of the sulfur and the vulcanization accelerator) were compounded with the rubber compositions and the mixtures were kneaded in a 1.8 L sealed mixed for five minutes at 160° C. Then, the mixtures were extruded as master batches, to which the sulfur and the vulcanization accelerator were added. Thereafter, the master batches were kneaded on an open roll. Note that in Tables 1 to 3, in cases where the SBR comprises an extension oil, the compounded amount of the SBR comprising this extension oil is noted along with the NET compounded amount of the SBR without the oil in parentheses. Additionally, the contents of the shared components shown in Table 4 are parts by weight compounded per 100 parts by weight of the diene rubber shown in Tables 1 to 3 (NET rubber content).

Vulcanized rubber samples were fabricated by pressure vulcanizing the obtained 24 types of rubber compositions for use in tire treads in a mold having a predetermined shape for 20 minutes at 160° C. Then, the rolling resistance (tan δ at 60° C.) of the samples was measured according to the methods described below.

Rolling Resistance: tan δ (60° C.)

The rolling resistance of the obtained vulcanized rubber samples was evaluated based on the loss tangent tan δ (60° C.), which is a known indicator of rolling resistance. The tan δ (60° C.) was measured using a viscoelasticity spectrometer (manufactured by Toyo Seiki Seisaku-sho, Ltd.) under the following conditions: 10% initial distortion, ±2% amplitude, 20 Hz frequency, and 60° C. temperature. The results of the measuring were indexed and recorded in Tables 1 to 3, with the index value of Comparative Example 1 being 100. Smaller index values indicate smaller tan δ (60° C.) and lower heat build-up, which in turn indicates lower rolling resistance and superior fuel consumption performance when used in a pneumatic tire.

Next, sets of four pneumatic tires having the tire structure depicted in FIG. 1 and a tire size of 225/50R17 were fabricated. In each of the sets of four tires, one of the 24 types of rubber compositions for use in tire treads described above was used in the tread portion. The steering stability and braking performance on wet road surfaces of the resulting 24 types of pneumatic tires were evaluated according to the methods described below.

Steering Stability on Wet Road Surfaces

The pneumatic tires were assembled on a wheel having a rim size of 7×J, and mounted on a 2.5 L class test vehicle (made in Japan). The pneumatic tires were inflated to an air pressure of 230 kPa and the test vehicle was driven on a 2.6 km circuit wet road surface test course. The steering stability while driving was scored based on sensory evaluation performed by three experienced evaluators. The results of the measuring were indexed and recorded in Tables 1 to 3, with the index value of Comparative Example 1 being 100. Larger index values indicate superior wet steering stability on wet road surfaces.

Braking Performance on Wet Road Surfaces

The pneumatic tires were assembled on a wheel having a rim size of 7×J, and mounted on a 2.5 L class test vehicle (made in Japan). The pneumatic tires were inflated to an air pressure of 230 kPa and the test vehicle was driven on a 2.6 km circuit wet road surface test course. The braking performance while driving was scored based on sensory evaluation performed by three experienced evaluators. The results of the measuring were indexed and recorded in Tables 1 to 3, with the index value of Comparative Example 1 being 100. Larger index values indicate superior wet braking performance on wet road surfaces.

TABLE 1

|  |  | Comparative Example 1 | Comparative Example 2 | Comparative Example 3 | Working Example 1 |
|---|---|---|---|---|---|
| Modified S-SBR 1 | pbw |  |  | 62.5 (50.0) | 62.5 (50.0) |
| Modified S-SBR 2 | pbw | 50.0 | 50.0 |  |  |
| E-SBR | pbw | 68.75 (50.0) | 68.75 (50.0) | 68.75 (50.0) | 68.75 (50.0) |
| Silica | pbw | 40 | 40 | 40 | 40 |
| CB | pbw | 5 | 5 | 5 | 5 |
| Coupling agent | pbw | 3.2 | 3.2 | 3.2 | 3.2 |
| Tackifying resin 1 | pbw | 5 |  |  | 5 |
| Tackifying resin 2 | pbw |  |  |  |  |
| Tackifying resin 3 | pbw |  |  |  |  |
| Oil | pbw | 2.5 | 5.0 | 5.0 | 2.5 |
| tanδ (60° C.) | Index value | 100 | 100 | 97 | 97 |
| Wet steering stability | Index value | 100 | 95 | 103 | 108 |
| Wet braking performance | Index value | 100 | 95 | 105 | 111 |

|  |  | Working Example 2 | Working Example 3 | Working Example 4 | Working Example 5 |
|---|---|---|---|---|---|
| Modified S-SBR 1 | pbw | 62.5 (50.0) | 62.5 (50.0) | 62.5 (50.0) | 62.5 (50.0) |
| Modified S-SBR 2 | pbw |  |  |  |  |
| E-SBR | pbw | 68.75 (50.5) | 68.75 (50.0) | 68.75 (50.0) | 68.75 (50.0) |
| Silica | pbw | 40 | 40 | 60 | 40 |
| CB | pbw | 5 | 5 | 0 | 5 |
| Coupling agent | pbw | 3.2 | 3.2 | 4.8 | 3.2 |
| Tackifying resin 1 | pbw | 10 |  | 5 |  |
| Tackifying resin 2 | pbw |  | 10 |  |  |
| Tackifying resin 3 | pbw |  |  |  | 5 |
| Oil | pbw |  |  | 2.5 | 2.5 |
| tanδ (60° C.) | Index value | 98 | 97 | 98 | 98 |
| Wet steering stability | Index value | 114 | 119 | 122 | 125 |
| Wet braking performance | Index value | 116 | 122 | 125 | 127 |

TABLE 2

|  |  | Comparative Example 4 | Comparative Example 5 | Comparative Example 6 | Comparative Example 7 |
|---|---|---|---|---|---|
| Modified S-SBR 1 | pbw | 62.5 (50.0) |  |  |  |
| Modified S-SBR 3 | pbw |  | 60.0 (50.0) |  |  |
| Modified S-SBR 4 | pbw |  |  | 50.0 |  |
| Modified S-SBR 5 | pbw |  |  |  | 50.0 |
| S-SBR | pbw |  |  |  |  |
| E-SBR | pbw | 68.75 (50.0) | 68.75 (50.0) | 68.75 (50.0) | 68.75 (50.0) |
| Silica | pbw | 40 | 40 | 40 | 40 |
| CB | pbw | 5 | 5 | 5 | 5 |
| Coupling agent | pbw | 3.2 | 3.2 | 3.2 | 3.2 |
| Tackifying resin 1 | pbw |  | 5 | 5 | 5 |
| Tackifying resin 4 | pbw | 5 |  |  |  |
| Oil | pbw | 2.5 | 2.5 | 2.5 | 2.5 |
| tanδ (60° C.) | Index value | 106 | 100 | 99 | 101 |
| Wet steering stability | Index value | 130 | 100 | 98 | 102 |
| Wet braking performance | Index value | 133 | 103 | 101 | 105 |

|  |  | Comparative Example 8 | Comparative Example 9 | Comparative Example 10 | Comparative Example 11 |
|---|---|---|---|---|---|
| Modified S-SBR 1 | pbw |  | 25.0 (20.0) | 62.5 (50.0) | 62.5 (50.0) |
| Modified S-SBR 3 | pbw |  |  |  |  |

TABLE 2-continued

|  |  |  |  |  |  |
|---|---|---|---|---|---|
| Modified S-SBR 4 | pbw |  |  |  |  |
| Modified S-SBR 5 | pbw |  |  |  |  |
| S-SBR | pbw | 68.75 (50.0) |  |  |  |
| E-SBR | pbw | 68.75 (50.0) | 110.0 (80.0) | 68.75 (50.0) | 68.75 (50.0) |
| Silica | pbw | 40 | 40 | 40 | 20 |
| CB | pbw | 5 | 5 | 5 | 25 |
| Coupling agent | pbw | 3.2 | 3.2 | 3.2 | 1.6 |
| Tackifying resin 1 | pbw | 5 | 5 | 50 | 5 |
| Tackifying resin 4 | pbw |  |  |  |  |
| Oil | pbw | 2.5 | 2.5 |  | 2.5 |
| tanδ (60° C.) | Index value | 101 | 105 | 116 | 100 |
| Wet steering stability | Index value | 85 | 90 | 78 | 101 |
| Wet braking performance | Index value | 88 | 93 | 73 | 100 |

TABLE 3

|  |  | Comparative Example 12 | Comparative Example 13 | Working Example 6 | Working Example 7 |
|---|---|---|---|---|---|
| Modified S-SBR 1 | pbw | 62.5 (50.0) | 62.5 (50.0) |  |  |
| Modified S-SBR 6 | pbw |  |  | 62.5 (50.0) |  |
| Modified S-SBR 7 | pbw |  |  |  | 62.5 (50.0) |
| Modified S-SBR 8 | pbw |  |  |  |  |
| Modified S-SBR 9 | pbw |  |  |  |  |
| Modified S-SBR 10 | pbw |  |  |  |  |
| Modified S-SBR 11 | pbw |  |  |  |  |
| E-SBR | pbw | 68.75 (50.0) | 68.75 (50.0) | 68.75 (50.0) | 68.75 (50.0) |
| Silica | pbw | 15 | 80 | 40 | 40 |
| CB | pbw | 3 | 5 | 5 | 5 |
| Coupling agent | pbw | 1.2 | 5.6 | 3.2 | 3.2 |
| Tackifying resin 1 | pbw | 5 | 5 | 5 | 5 |
| Oil | pbw | 2.5 | 2.5 | 2.5 | 2.5 |
| tanδ (60° C.) | Index value | 87 | 110 | 98 | 98 |
| Wet steering stability | Index value | 74 | 100 | 108 | 107 |
| Wet braking performance | Index value | 73 | 102 | 108 | 107 |

|  |  | Comparative Example 14 | Comparative Example 15 | Comparative Example 16 | Comparative Example 17 |
|---|---|---|---|---|---|
| Modified S-SBR 1 | pbw |  |  |  |  |
| Modified S-SBR 6 | pbw |  |  |  |  |
| Modified S-SBR 7 | pbw |  |  |  |  |
| Modified S-SBR 8 | pbw | 62.5 (50.0) |  |  |  |
| Modified S-SBR 9 | pbw |  | 62.5 (50.0) |  |  |
| Modified S-SBR 10 | pbw |  |  | 62.5 (50.0) |  |
| Modified S-SBR 11 | pbw |  |  |  | 62.5 (50.0) |
| E-SBR | pbw | 68.75 (50.0) | 68.75 (50.0) | 68.75 (50.0) | 68.75 (50.0) |
| Silica | pbw | 40 | 40 | 40 | 40 |
| CB | pbw | 5 | 5 | 5 | 5 |
| Coupling agent | pbw | 3.2 | 3.2 | 3.2 | 3.2 |
| Tackifying resin 1 | pbw | 5 | 5 | 5 | 5 |
| Oil | pbw | 2.5 | 2.5 | 2.5 | 2.5 |
| tanδ (60° C.) | Index value | 90 | 105 | 90 | 104 |
| Wet steering stability | Index value | 100 | 116 | 99 | 115 |
| Wet braking performance | Index value | 98 | 118 | 97 | 117 |

The types of raw materials used in Tables 1 to 3 are described below.

Modified S-SBR 1: Terminal-modified solution polymerization styrene butadiene rubber prepared according to the production method described below; modified conjugated diene polymer rubber; aromatic vinyl unit content of 42% by weight; vinyl unit content of 32% by weight; weight-average molecular weight (Mw) of 750,000; Tg of −25° C.; oil extended product comprising 25 parts by weight of oil per 100 parts by weight of the rubber component.

[Production Method of Modified S-SBR 1]

4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 5.061 mL (7.945 mmol) of n-butyllithium was added. After the rate of polymerization/conversion reached approximately 100%, 12.0 g more of isoprene was added and the mixture was reacted for five minutes. Then, 0.281 g (0.318 mmol) of a toluene solution containing 40% by weight of 1,6-bis(trichlorosilyl) hexane was added and the mixture was reacted for 30 minutes. Furthermore, 18.3 g (0.318 mmol) of a xylene solution containing 40% by weight of polyorganosiloxane A described below was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 1 was obtained.

Polyorganosiloxane A: Polyorganosiloxane having the structure of the general formula (I), wherein m=80, n=0, k=120, $X^1$, $X^4$, $R^1$ to $R^3$, and $R^5$ to $R^8$ are each methyl groups (—CH$_3$), and $X^2$ is a hydrocarbon group expressed by formula (VIII) below.

Formula (VIII)

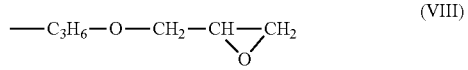
(VIII)

Modified S-SBR 2: Terminal-modified solution polymerization styrene butadiene rubber; aromatic vinyl unit content of 20% by weight; vinyl unit content of 67%; weight-average molecular weight (Mw) of 510,000; Tg of −25° C.; Nipol NS616 (Zeon Corporation); non-oil extended product.

Modified S-SBR 3: Terminal-modified solution polymerization styrene butadiene rubber; aromatic vinyl unit content of 35% by weight; vinyl unit content of 48%; weight-average molecular weight (Mw) of 450,000; Tg of −30° C.; SE0372 (manufactured by Sumitomo Chemical Co., Ltd.); oil extended product comprising 20 parts by weight of oil per 100 parts by weight of the rubber component.

Modified S-SBR 4: Terminal-modified solution polymerization styrene butadiene rubber; aromatic vinyl unit content of 30% by weight; vinyl unit content of 61%; weight-average molecular weight (Mw) of 430,000; Tg of −27° C.; N207 (manufactured by Asahi Kasei Corporation); non-oil extended product.

Modified S-SBR 5: Terminal-modified solution polymerization styrene butadiene rubber; aromatic vinyl unit content of 42% by weight; vinyl unit content of 35%; weight-average molecular weight (Mw) of 440,000; Tg of −24° C.; Asaprene Eli) (manufactured by Asahi Kasei Corporation); non-oil extended product.

Modified S-SBR 6: Terminal-modified solution polymerization styrene butadiene rubber prepared according to the production method described below; modified conjugated diene polymer rubber formed from a polyorganosiloxane having the structure of the general formula (II); aromatic vinyl unit content of 42% by weight; vinyl unit content of 32%; weight-average molecular weight (Mw) of 750,000; Tg of −25° C.; oil extended product comprising 25 parts by weight of oil per 100 parts by weight of the rubber component.

[Production Method of Modified S-SBR 6]

4550 g of cyclohexane, 341.1 g (3.275 mol) of styrene, 459.9 g (8.502 mol) of butadiene, 20.0 g (0.294 mol) of isoprene, and 0.190 mL (1.277 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 5.062 mL (7.946 mmol) of n-butyllithium was added. After the rate of polymerization/conversion reached approximately 100%, 12.0 g more of isoprene was added and the mixture was reacted for five minutes. Then, 0.283 g (0.320 mmol) of a toluene solution containing 40% by weight of 1,6-bis(trichlorosilyl) hexane was added and the mixture was reacted for 30 minutes. Furthermore, 19.0 g (0.330 mmol) of a xylene solution containing 40% by weight of polyorganosiloxane B described below was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 6 was obtained.

Polyorganosiloxane B: Polyorganosiloxane having the structure of the general formula (II), wherein $R^9$ to $R^{16}$ are each methyl groups (—CH$_3$), and $X^5$ to $X^8$ are each hydrocarbon groups expressed by the formula (VIII).

Modified S-SBR 7: Terminal-modified solution polymerization styrene butadiene rubber prepared according to the production method described below; modified conjugated diene polymer rubber formed from a polyorganosiloxane having the structure of the general formula (III); aromatic vinyl unit content of 41% by weight; vinyl unit content of 32%; weight-average molecular weight (Mw) of 750,000; Tg of −25° C.; oil extended product comprising 25 parts by weight of oil per 100 parts by weight of the rubber component.

[Production Method of Modified S-SBR 7]

4542 g of cyclohexane, 339.2 g (3.257 mol) of styrene, 462.8 g (8.556 mol) of butadiene, 20.0 g (0.294 mol) of isoprene, and 0.188 mL (1.264 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 5.059 mL (7.942 mmol) of n-butyllithium was added. After the rate of polymerization/conversion reached approximately 100%, 12.0 g more of isoprene was added and the mixture was reacted for five minutes. Then, 0.283 g (0.320 mmol) of a toluene solution containing 40% by weight of 1,6-bis(trichlorosilyl) hexane was added and the mixture was reacted for 30 minutes. Furthermore, 19.2 g (0.333 mmol) of a xylene solution containing 40% by weight of polyorganosiloxane C described below was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 7 was obtained.

Polyorganosiloxane C: Polyorganosiloxane having the structure of the general formula (III), wherein s=2, $R^{17}$ to $R^{19}$ are each methyl groups (—$CH_3$), and $X^9$ to $X^{11}$ are each hydrocarbon groups expressed by the formula (VIII).

Modified S-SBR 8: Terminal-modified solution polymerization styrene butadiene rubber prepared according to the production method described below; modified conjugated diene polymer rubber formed from a polyorganosiloxane having the structure of the general formula (I); aromatic vinyl unit content of 34% by weight; vinyl unit content of 34%; weight-average molecular weight (Mw) of 760,000; Tg of −33° C.; oil extended product comprising 25 parts by weight of oil per 100 parts by weight of the rubber component.

[Production Method of Modified S-SBR 8]

4541 g of cyclohexane, 277.6 g (2.665 mol) of styrene, 523.1 g (9.671 mol) of butadiene, 20.0 g (0.294 mol) of isoprene, and 0.175 mL (1.178 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 4.984 mL (7.824 mmol) of n-butyllithium was added. After the rate of polymerization/conversion reached approximately 100%, 12.0 g more of isoprene was added and the mixture was reacted for five minutes. Then, 0.273 g (0.327 mmol) of a toluene solution containing 40% by weight of 1,6-bis(trichlorosilyl) hexane was added and the mixture was reacted for 30 minutes. Furthermore, 18.1 g (0.314 mmol) of a xylene solution containing 40% by weight of the polyorganosiloxane A described above was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 8 was obtained.

Modified S-SBR 9: Terminal-modified solution polymerization styrene butadiene rubber prepared according to the production method described below; modified conjugated diene polymer rubber formed from a polyorganosiloxane having the structure of the general formula (I); aromatic vinyl unit content of 49% by weight; vinyl unit content of 28%; weight-average molecular weight (Mw) of 710,000; Tg of −17° C.; oil extended product comprising 25 parts by weight of oil per 100 parts by weight of the rubber component.

[Production Method of Modified S-SBR 9]

4536 g of cyclohexane, 401.0 g (3.850 mol) of styrene, 392.0 g (7.247 mol) of butadiene, 20.0 g (0.294 mol) of isoprene, and 0.201 mL (1.352 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 5.141 mL (8.071 mmol) of n-butyllithium was added. After the rate of polymerization/conversion reached approximately 100%, 12.0 g more of isoprene was added and the mixture was reacted for five minutes. Then, 0.279 g (0.320 mmol) of a toluene solution containing 40% by weight of 1,6-bis(trichlorosilyl) hexane was added and the mixture was reacted for 30 minutes. Furthermore, 18.6 g (0.323 mmol) of a xylene solution containing 40% by weight of the polyorganosiloxane A described above was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 9 was obtained.

Modified S-SBR 10: Terminal-modified solution polymerization styrene butadiene rubber prepared according to the production method described below; modified conjugated diene polymer rubber formed from a polyorganosiloxane having the structure of the general formula (I); aromatic vinyl unit content of 41% by weight; vinyl unit content of 17%; weight-average molecular weight (Mw) of 740,000; Tg of −37° C.; oil extended product comprising 25 parts by weight of oil per 100 parts by weight of the rubber component.

[Production Method of Modified S-SBR 10]

4542 g of cyclohexane, 339.2 g (3.257 mol) of styrene, 462.8 g (8.556 mol) of butadiene, 20.0 g (0.294 mol) of isoprene and 0.0376 mL (0.253 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 5.059 mL (7.942 mmol) of n-butyllithium was added. After the rate of polymerization/conversion reached approximately 100%, 12.0 g more of isoprene was added and the mixture was reacted for five minutes. Then, 0.280 g (0.331 mmol) of a toluene solution containing 40% by weight of 1,6-bis(trichlorosilyl) hexane was added and the mixture was reacted for 30 minutes. Furthermore, 18.8 g (0.326 mmol) of a xylene solution containing 40% by weight of the polyorganosiloxane A described above was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 10 was obtained.

Modified S-SBR 11: Terminal-modified solution polymerization styrene butadiene rubber prepared according to the production method described below; modified conjugated diene polymer rubber formed from a polyorganosiloxane having the structure of the general formula (I); aromatic vinyl unit content of 39% by weight; vinyl unit content of 40%; weight-average molecular weight (Mw) of 750,000; Tg of −21° C.; oil extended product comprising 25 parts by weight of oil per 100 parts by weight of the rubber component.

[Production Method of Modified S-SBR 11]

4543 g of cyclohexane, 319.8 g (3.071 mol) of styrene, 480.1 g (8.876 mol) of butadiene, 20.0 g (0.294 mol) of isoprene and 0.217 mL (1.462 mmol) of N,N,N',N'-tetramethylethylenediamine were added to a nitrogen-purged autoclave reaction vessel having an internal capacity of 10 L. Then, mixing was begun. After adjusting the temperature of the matter in the reaction vessel to 50° C., 5.141 mL (8.0714 mmol) of n-butyllithium was added. After the rate of polymerization/conversion reached approximately 100%, 12.0 g more of isoprene was added and the mixture was reacted for five minutes. Then, 0.279 g (0.320 mmol) of a toluene solution containing 40% by weight of 1,6-bis(trichlorosilyl) hexane was added and the mixture was reacted for 30 minutes. Furthermore, 18.6 g (0.323 mmol) of a xylene solution containing 40% by weight of the polyorganosiloxane A described above was added and the mixture was reacted for 30 minutes. 0.5 mL of methanol was added and the mixture was mixed for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 11 was obtained.

- S-SBR: Unmodified solution polymerization styrene butadiene rubber; aromatic vinyl unit content of 41% by weight; vinyl unit content of 25% by weight; weight-average molecular weight (Mw) of 1,010,000; Tg of −30° C.; SLR6430 (manufactured by Dow Chemical); oil extended product comprising 37.5 parts by weight of oil per 100 parts by weight of the rubber component.
- E-SBR: Emulsion polymerization styrene butadiene rubber; aromatic vinyl unit content of 25% by weight; vinyl unit content of 15% by weight; weight-average molecular weight (Mw) of 600,000; Tg of −52° C.; Nipol 1723 (manufactured by Zeon Corporation); oil extended product comprising 37.5 parts by weight of oil per 100 parts by weight of the rubber component.
- Silica: Zeosil 1165 MP (manufactured by Rhodia); DBP absorption number of 200 ml/100 g; nitrogen specific surface area ($N_2SA$) of 160 $m^2/g$; CTAB specific surface area (CTAB) of 159 $m^2/g$.
- CB: Carbon black, SEAST KH (manufactured by Tokai Carbon Co., Ltd.)
- Coupling agent: Si69 (manufactured by Evonik Degussa Industries)
- Tackifying resin 1: Aromatic modified terpene resin; Tg of 31° C.; YS Resin TO-85 (manufactured by Yasuhara Chemical Co., Ltd.)
- Tackifying resin 2: Aromatic modified terpene resin; Tg of 53° C.; YS Resin TO-105 (manufactured by Yasuhara Chemical Co., Ltd.)
- Tackifying resin 3: Aromatic modified terpene resin; Tg of 77° C.; YS Resin TO-125 (manufactured by Yasuhara Chemical Co., Ltd.)
- Tackifying resin 4: Phenol-modified terpene resin; Tg of 87° C.; YS Polyster T145 (manufactured by Yasuhara Chemical Co., Ltd.)
- Oil: Extract No. 4S (manufactured by Showa Shell Seikyu K.K.)

TABLE 4

| Common Formulation of the Rubber Compositions | |
|---|---|
| Zinc oxide | 3 parts by weight |
| Stearic acid | 2 parts by weight |
| Antiaging agent | 2 parts by weight |
| Wax | 2 parts by weight |
| Sulfur | 1.8 parts by weight |
| Vulcanization accelerator 1 | 2 parts by weight |
| Vulcanization accelerator 2 | 1.5 parts by weight |

The types of raw materials used in Table 4 are described below.

- Zinc oxide: Zinc Oxide #3 (manufactured by Seido Chemical Industry Co., Ltd.)
- Stearic acid: Beads Stearic Acid YR (manufactured by NOF Corp.)
- Antiaging agent: Santoflex 6PPD (manufactured by Flexsys)
- Wax: SANNOC (manufactured by Ouchi Shinko Chemical Industrial)
- Sulfur: "Golden Flower" oil-treated sulfur powder (manufactured by Tsurumi Chemical Industry Co., Ltd.)
- Vulcanization Accelerator 1: Vulcanization accelerator CBS; Nocceler CZ-G (manufactured by Ouchi Shinko Chemical Industrial Co., Ltd.)
- Vulcanization Accelerator 2: Vulcanization accelerator DPG; Nocceler D (manufactured by Ouchi Shinko Chemical Industrial Co., Ltd.)

As is clear from Tables 1 and 3, with the rubber compositions for use in tire treads of Working Examples 1 to 7, enhanced low rolling resistance (tan δ at 60° C.), wet steering stability, and wet braking performance were confirmed. With the rubber composition of Comparative Example 2, the wet steering stability and the wet braking performance declined because, in contrast with Comparative Example 1, the tackifying resin 1 was not compounded. With the rubber composition of Comparative Example 3, compared to Working Examples 1 to 5, the wet steering stability and the wet braking performance were inferior because, in contrast with Working Examples 1 to 5, the tackifying resin was not compounded.

As is clear from Table 2, with the rubber composition of Comparative Example 4, the rolling resistance is negatively affected because the Tg of the tackifying resin 4 is more than 110° C. higher than the Tg of the modified S-SBR 1. With the rubber composition of Comparative Example 5, the rolling resistance cannot be reduced and the wet steering stability and the wet braking performance cannot be improved because the aromatic vinyl unit content in the modified S-SBR 3 is less than 38% by weight, the vinyl unit content exceeds 35% by weight, and the weight-average molecular weight is less than 600,000. With the rubber composition of Comparative Example 6, the rolling resistance cannot be reduced and the wet steering stability and the wet braking performance cannot be improved because the aromatic vinyl unit content in the modified S-SBR 4 is less than 38% by weight, the vinyl unit content exceeds 35% by weight, and the weight-average molecular weight is less than 600,000. With the rubber composition of Comparative Example 7, the rolling resistance cannot be reduced and the wet steering stability and the wet braking performance cannot be improved because the weight-average molecular weight of the modified S-SBR 5 is less than 600,000. With the rubber composition of Comparative Example 8, the rolling resistance cannot be reduced and the wet steering stability and the wet braking performance are negatively affected because the unmodified S-SBR is compounded in place of the modified conjugated diene polymer rubber. With the rubber composition of Comparative Example 9, the rolling resistance cannot be reduced and the wet steering stability and the wet braking performance decline because the content of the modified S-SBR 1 is less than 30% by weight in the diene rubber. With the rubber composition of Comparative Example 10, the rolling resistance, the wet steering stability, and the wet braking performance are negatively affected because the compounded amount of the tackifying resin 1 exceeds 25 parts by weight.

As is clear from Table 3, with the rubber composition of Comparative Example 11, the rolling resistance cannot be reduced and the effects of improving the wet steering stability and the wet braking performance cannot be obtained because the content of the silica in the filler is less than 50% by weight. With the rubber composition of Comparative Example 12, the wet steering stability and the wet braking performance decline because the compounded amount of the filler comprising the silica is less than 25 parts by weight. With the rubber composition of Comparative Example 13, the rolling resistance cannot be reduced, and the effects of improving the wet steering stability and the wet braking performance are insufficient because the compounded amount of the filler comprising the silica exceeds 80 parts by weight.

With the rubber composition of Comparative Example 14, the effects of improving the wet steering stability and the wet braking performance are inferior compared to those of Working Examples 1 to 5 because the aromatic vinyl unit content in the modified S-SBR 7 is less than 38% by weight. With the rubber composition of Comparative Example 15, the glass transition temperature (Tg) of the conjugated diene polymer rubber rises and the rolling resistance cannot be reduced because the aromatic vinyl monomer unit content in the modified S-SBR 9 is greater than 48% by weight. With the rubber composition of Comparative Example 16, the effects of improving the wet steering stability and the wet braking performance are inferior compared to those of Working Examples 1 to 7 because the vinyl unit content in the modified S-SBR 10 is less than 20% by weight. With the rubber composition of Comparative Example 17, the rolling resistance cannot be reduced because the vinyl unit content in the modified S-SBR 11 exceeds 35% by weight.

The invention claimed is:

1. A rubber composition for use in tire treads comprising a diene rubber including not less than 30% by weight of a modified conjugated diene polymer rubber and, per 100 parts by weight of the diene rubber, from 2.5 to 10 parts by weight of a tackifying resin which is an aromatic modified terpene resin and which does not include a phenol modified terpene resin, from 0 to 5 parts by weight of carbon black, and from 25 to 80 parts by weight of a filler; the filler comprising not less than 50% by weight of silica; the modified conjugated diene polymer rubber being obtained by copolymerizing a conjugated diene monomer unit and an aromatic vinyl monomer unit in a hydrocarbon solvent using an organic active metal compound as an initiator; a resulting active conjugated diene polymer chain thereof having a terminal modified group, obtained by reacting the active terminal of the polymer chain with at least one type of compound having a functional group that is reactable with the active terminal of the polymer chain; the terminal modified group having a functional group that interacts with the silica; in the modified conjugated diene polymer rubber, aromatic vinyl unit content being from 38% to 48% by weight, vinyl unit content being from 20% to 35%, weight-average molecular weight being from 600,000 to 1,000,000, and glass transition temperature being from −22 to −32° C.; and a glass transition temperature of the tackifying resin being from 50 to 110° C. higher than the glass transition temperature of the modified conjugated diene polymer rubber, the glass transition temperature of the tackifying resin being between 31° C. and 70° C.

2. The rubber composition for use in tire treads according to claim 1, wherein the compound comprising the functional group that is reactable with the active terminal of the active conjugated diene polymer chain comprises at least one type of polyorganosiloxane compound selected from general formulae (I) to (III) below:

Formula (I)

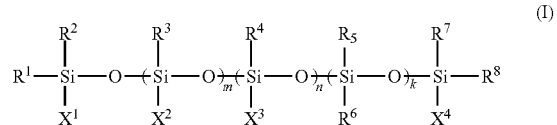

wherein $R^1$ to $R^8$ are identical or different and are alkyl groups having from 1 to 6 carbons or aryl groups having from 6 to 12 carbons, $X^1$ and $X^4$ are identical or different and are groups having functional groups that react with the active terminal of the active conjugated diene polymer chain, alkyl groups having from 1 to 6 carbons, or aryl groups having from 6 to 12 carbons, $X^2$ is a group having a functional group that reacts with the active terminal of the active conjugated diene polymer chain, $X^3$ is a group including from 2 to 20 repeating alkylene glycol units, a portion of the $X^3$ moieties optionally being groups derived from groups including from 2 to 20 repeating alkylene glycol units, and m is an integer from 3 to 200, n is an integer from 0 to 200, and k is an integer from 0 to 200;

Formula (II)

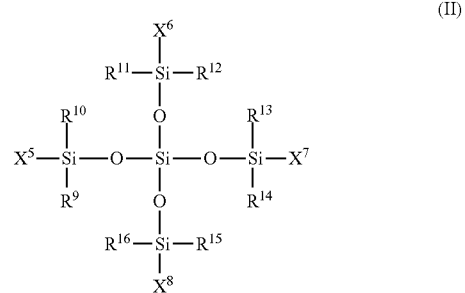

wherein $R^9$ to $R^{16}$ are identical or different and are alkyl groups having from 1 to 6 carbons or aryl groups having from 6 to 12 carbons, and $X^5$ to $X^8$ are groups having functional groups that react with the active terminal of the active conjugated diene polymer chain;

Formula (III)

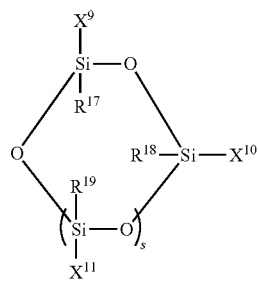

(III)

wherein $R^{17}$ to $R^{19}$ are identical or different and are alkyl groups having from 1 to 6 carbons or aryl groups having from 6 to 12 carbons, $X^9$ to $X^{11}$ are groups having functional groups that react with the active terminal of the active conjugated diene polymer chain, and s is an integer from 1 to 18.

3. The rubber composition for use in tire treads according to claim 1, wherein the compound comprising the functional group that is reactable with the active terminal of the active conjugated diene polymer chain comprises at least one type of polyorganosiloxane compound according to general formula (I) below:

Formula (I)

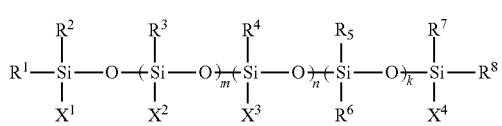

(I)

wherein $R^1$ to $R^8$ are identical or different and are alkyl groups having from 1 to 6 carbons or aryl groups having from 6 to 12 carbons, $X^1$ and $X^4$ are identical or different and are groups having functional groups that react with the active terminal of the active conjugated diene polymer chain, alkyl groups having from 1 to 6 carbons, or aryl groups having from 6 to 12 carbons, $X^2$ is a group having a functional group that reacts with the active terminal of the active conjugated diene polymer chain, $X^3$ is a group including from 2 to 20 repeating alkylene glycol units, a portion of the $X^3$ moieties optionally being groups derived from groups including from 2 to 20 repeating alkylene glycol units, and m is an integer from 3 to 200, n is an integer from 0 to 200, and k is an integer from 0 to 200.

4. The rubber composition for use in tire treads according to claim 1, wherein the compound comprising the functional group that is reactable with the active terminal of the active conjugated diene polymer chain comprises at least one type of polyorganosiloxane compound according to general formula (II) below:

Formula (II)

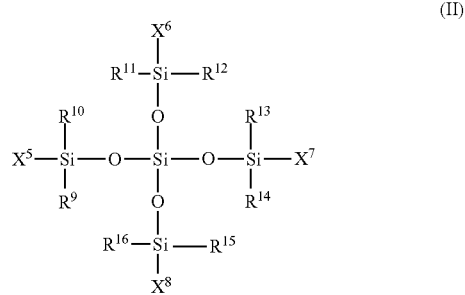

(II)

wherein $R^9$ to $R^{16}$ are identical or different and are alkyl groups having from 1 to 6 carbons or aryl groups having from 6 to 12 carbons, and $X^5$ to $X^8$ are groups having functional groups that react with the active terminal of the active conjugated diene polymer chain.

5. The rubber composition for use in tire treads according to claim 1, wherein the compound comprising the functional group that is reactable with the active terminal of the active conjugated diene polymer chain comprises at least one type of polyorganosiloxane compound according to general formula (III) below:

Formula (III)

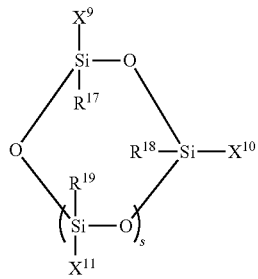

(III)

wherein $R^{17}$ to $R^{19}$ are identical or different and are alkyl groups having from 1 to 6 carbons or aryl groups having from 6 to 12 carbons, $X^9$ to $X^{11}$ are groups having functional groups that react with the active terminal of the active conjugated diene polymer chain, and s is an integer from 1 to 18.

6. The rubber composition for use in tire treads according to claim 1, wherein the glass transition temperature of the tackifying resin is from 50 to 95° C. higher than the glass transition temperature of the modified conjugated diene polymer rubber.

7. A pneumatic tire comprising the rubber composition described in claim 1.

8. A pneumatic tire comprising the rubber composition described in claim 2.

\* \* \* \* \*